W. MORRISON.
BATTERY.
APPLICATION FILED NOV. 2, 1912.

1,261,269. Patented Apr. 2, 1918.
2 SHEETS—SHEET 1.

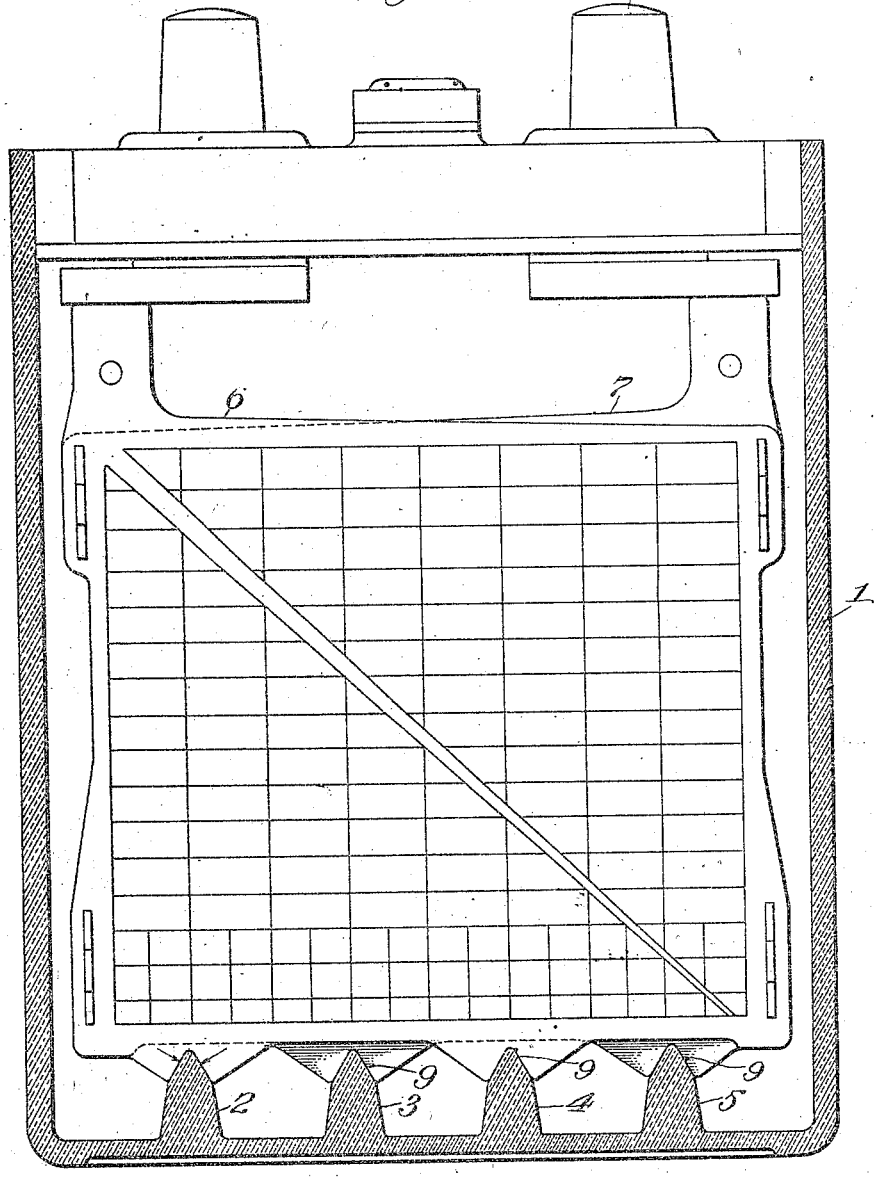

UNITED STATES PATENT OFFICE.

WILLIAM MORRISON, OF CHICAGO, ILLINOIS.

BATTERY.

1,261,269.

Specification of Letters Patent.

Patented Apr. 2, 1918.

Application filed November 2, 1917. Serial No. 199,913.

*To all whom it may concern:*

Be it known that I, WILLIAM MORRISON, a citizen of the United States, residing at Chicago, in the county of Cook and State of Illinois, have invented certain new and useful Improvements in Batteries, of which the following is a specification.

This invention relates to secondary or storage battery constructions, the principal object of the invention being the provision of improved means for supporting the plates or grids within the container or cell. A preferred embodiment of the invention is illustrated in the accompanying drawing, wherein—

Fig. 3 is a view similar to Fig. 1 but showing the plates in position in the cell.

Figure 1:
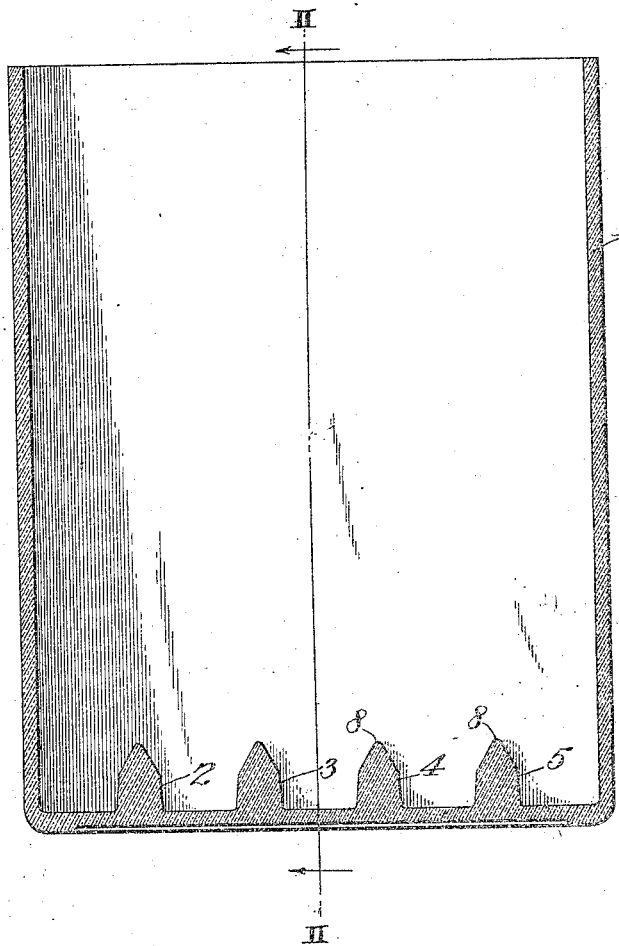
Figure 1 is a vertical longitudinal section of a battery cell.
Figure 2:
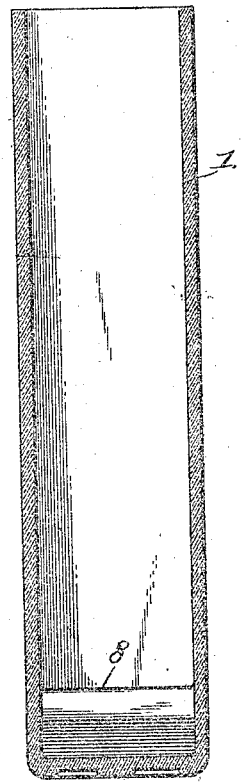
Fig. 2 is a transverse section thereof on line II—II of Fig. 1.

Referring to said drawing, 1 represents the container or battery cell, made for example of hard rubber or other appropriate insulating material. 2, 3, 4, 5 indicate the supporting ribs which carry the plates, and which may be formed integral with the body of the cell. 6, 7 (Fig. 3) designate the plates in position upon the supporting ribs.

As clearly indicated in the figures, the ribs 2, 3, 4, 5 extend across the cell transversely of the plates. Four ribs are shown, those numbered 2 and 4 serving to support one set of plates (for example the positive plates 6) and those numbered 3 and 5 supporting the negative plates 7. In this construction therefore plates of opposite polarity do not rest upon or contact with the same supporting rib or ribs.

The ribs present upper angular (beveled) edges 8 an angle approximating 60° at the apex being suitable. The plates are marginally recessed on their lower edges as indicated at 9, these recesses conforming to the beveled edges of the ribs, and being positioned to engage these edges; the plates of opposite polarity resting, as above described, upon alternate ribs.

The provision of these beveled supporting ribs in combination with conformed marginal recesses in the plates supported upon the ribs is of particular value in that it allows the relatively heavy weight of the plates to be carried by the ribs without rendering the latter liable to deformation or spreading under the weight and impact in service, such as truck-work. This is because in the present construction the thrust of the plates due to their weight, as well as the impact of the plates under the vibration of a moving vehicle is directed definitely inwardly, or approximately normal to the beveled plane faces of the ribs, as indicated by the arrows in Fig. 3. Other advantages are that the surface of contact between the plates and the ribs is made sufficiently large to withstand the impact of the weight under working conditions, and also to prevent skidding or moving of the plates within the cell, with resulting wearing away of the tops of the supporting ribs, breaking of the sealing compound, and other difficulties. Furthermore, the form of the ribs is such as to prevent them from accumulating a loose conductive deposit.

I claim:—

1. In a battery, the combination with a container having a plurality of spaced supporting ribs presenting upper beveled edges, of battery plates provided with angular marginal recesses positioned to receive said ribs and conforming to the beveled edges thereof.

2. In a battery, the combination with a container having a plurality of spaced supporting ribs presenting upper beveled edges, of battery plates provided with angular marginal recesses positioned to receive alternate ribs and conforming to the beveled edges thereof.

3. In a battery, the combination with a container having a plurality of spaced supporting ribs having their upper edges beveled at an angle of substantially 60°, of battery plates provided with angular marginal recesses positioned to receive said ribs and conforming to the beveled edges thereof.

4. In a battery, the combination with a container having a plurality of spaced supporting ribs having their upper edges beveled at an angle of substantially 60°, of battery plates provided with angular marginal recesses positioned to receive alternate ribs and conforming to the beveled edges thereof.

In testimony whereof, I affix my signature.

WILLIAM MORRISON.